United States Patent
Ozaki et al.

(10) Patent No.: US 8,720,947 B2
(45) Date of Patent: May 13, 2014

(54) GAS GENERATOR FOR RESTRAINING DEVICE

(71) Applicant: Daicel Corporation, Osaka (JP)

(72) Inventors: Nobuhiko Ozaki, Tatsuno (JP); Masayuki Yamazaki, Tatsuno (JP)

(73) Assignee: Daicel Corporation, Osaka (JP)

( * ) Notice: Subject to any disclaimer, the term of this patent is extended or adjusted under 35 U.S.C. 154(b) by 6203 days.

(21) Appl. No.: 13/764,877

(22) Filed: Feb. 12, 2013

(65) Prior Publication Data

US 2013/0233197 A1    Sep. 12, 2013

(30) Foreign Application Priority Data

Mar. 6, 2012    (JP) .................................. 2012-48713

(51) Int. Cl.
    *B60R 21/26*        (2011.01)
(52) U.S. Cl.
    USPC .......................................................... 280/741
(58) Field of Classification Search
    USPC ................... 280/741, 742, 740, 736
    See application file for complete search history.

(56) References Cited

U.S. PATENT DOCUMENTS

| 6,196,581 | B1 | 3/2001 | Katsuda et al. |
| 6,412,816 | B1 | 7/2002 | Gast et al. |
| 7,866,692 | B2 * | 1/2011 | Windhausen et al. ........ 280/736 |
| 2005/0029785 | A1 * | 2/2005 | Bilbrey et al. ................ 280/736 |

FOREIGN PATENT DOCUMENTS

| EP | 0 776 796 A2 | 6/1997 |
| EP | 1 681 210 A2 | 7/2006 |
| JP | 10-119705 A | 5/1998 |
| JP | 11-348712 A | 12/1999 |
| JP | 2009-1221 A | 1/2009 |
| WO | WO 2009/010504 A1 | 1/2009 |

OTHER PUBLICATIONS

International Search Report issued in International Application No. PCT/JP2013/056219 on Jun. 10, 2013.

* cited by examiner

*Primary Examiner* — Faye M. Fleming
(74) *Attorney, Agent, or Firm* — Birch, Stewart, Kolasch & Birch, LLP

(57) ABSTRACT

A gas generator for a restraining device includes, a housing having an ignition device and a diffuser portion, and a gas generating agent charged in an inner space of the housing,
a partition member, having a communication hole, and inclining with respect to a longitudinal axis (X) of the housing, thereby dividing the inner space into a gas generating agent charging space and a gas flow channel space, the gas flow channel space communicating with the diffuser portion, both of the edges of the partition member abutting against an inner circumferential surface of the housing, a cross-sectional area of the gas generating agent charging space decreasing from the ignition device side at one end of the housing to the diffuser portion side at the other end of the housing, and
a cross-sectional area of the gas flow channel space increasing from the ignition device side to the diffuser portion side.

9 Claims, 2 Drawing Sheets

GAS GENERATOR FOR RESTRAINING DEVICE

This nonprovisional application claims priority under 35 U.S.C. 119(a) to Patent Application No. 2012-48713 filed in Japan on 6 Mar. 2012, and 35 U.S.C. §119(e) to U.S. Provisional Application No. 61/607313 filed on 6 Mar. 2012, both of which are incorporated by reference.

BACKGROUND OF INVENTION

1. Field of Invention

The present invention relates to a gas generator for a restraining device that is suitable for airbag apparatus and the like.

2. Description of Related Art

A gas generator is known in which an ignition device is attached to one end in an inside of an elongated housing, a gas discharge port is provided at the other end, and a gas generating agent is charged into a space in the middle portion.

When the ignition device is actuated in such a gas generator, combustion advances from the gas generating agent located close to the ignition device toward the other end side, but since the gas generating agent is densely charged, it is necessary that gas generated by the combustion is guided to the gas discharge port, while the gas generating agent is burned.

U.S. Pat. No. 6,412,816 discloses a gas generator in which a tubular filtering system 4 is disposed inside an elongated housing 1, and the longitudinal axis of the filtering system 4 is arranged to match the housing axis.

One end of the housing is closed by a curved surface, and the exit ports 5 are formed in a circumferential wall in the vicinity of the closed end surface.

In the tubular filtering system 4, the opening at one end is abutted against the ignition device 2, the opening at the other end is abutted against the closed end surface, and the diameter of the tubular filtering system decreases continuously toward the closed end surface. Further, the filtering system is disposed from the opening at one end of the housing 1 to the closed end surface.

The gas generating mixture is charged into the tubular filtering system 4, the space between the tubular filtering system 4 and the housing 1 is an outflow chamber 7 serving as a gas flow channel space, and the gas flow channel space increases continuously in size toward the closed end surface side.

SUMMARY OF INVENTION

The present invention provides a gas generator for a restraining device including:

a cylindrical housing having an ignition device provided at one end in a long-axis direction thereof and a diffuser portion including a gas discharge port provided at the other end thereof;

a gas generating agent charged in an inner space of the housing;

a plate-like partition member, having a communication hole, disposed, in an inner space of the cylindrical housing, so as to incline relative to a long axis (X) of the cylindrical housing, thereby dividing the inner space into two mutually adjacent spaces, that is, a gas generating agent charging space and a gas flow channel space, the gas flow channel space communicating with the diffuser portion, both of side edges of the plate-like partition member being abutted against an inner circumferential surface of the cylindrical housing, a cross-sectional area of the gas generating agent charging space in a short-axis direction perpendicular to the long axis (X) decreasing from a side of the ignition device toward a side of the diffuser portion, a cross-sectional area of the gas flow channel space in the short-axis direction increasing from a side of the ignition device toward a side of the diffuser portion. (called hereinafter as the first aspect of the invention).

The present invention also provides a gas generator for a restraining device including:

a cylindrical housing having an ignition device provided at one end in a long-axis direction thereof and a diffuser portion including a gas discharge port provided at the other end thereof, and a gas generating agent charged in an inner space of the housing, an inner diameter and an outer diameter of the cylindrical housing increasing continuously from a side of the ignition device toward a side of the diffuser portion;

a plate-like partition member, having a communication hole, disposed, in an inner space of the cylindrical housing, so as to be parallel to a long axis (X) of the cylindrical housing, thereby dividing the inner space into two mutually adjacent spaces, that is, a gas generating agent charging space and a gas flow channel space, the gas flow channel space communicating with the diffuser portion, both of side edges of the plate-like partition surface being abutted against an inner circumferential surface of the cylindrical housing, at least a cross-sectional area of the gas flow channel space in a short-axis direction perpendicular to the long axis increasing from a side of the ignition device toward a side of the diffuser portion. (called hereinafter as the first aspect of the invention).

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 shows, in (*d*), a cross-sectional view in the long-axis direction of the gas generator of the present invention.

FIG. 2 shows a perspective view of the partition member shown in (*a*) in FIG. 1.

FIG. 3 shows, in (*a*), a cross-sectional view in the long-axis direction of the gas generator of another embodiment of the first aspect of the invention, in (*b*), a cross-sectional view in the short-axis direction at the first fixing surface shown in (*a*), and, in (*c*), a cross-sectional view in the short-axis direction at the intermediate position between those shown in (*b*) and (*c*), and, in (*d*), a cross-sectional view in the short-axis direction taken in the second fixing surface shown in (*a*).

FIG. 4 is a perspective view of the partition member shown in FIG. 3.

FIG. 5 shows, in (*a*), a cross-sectional view in the long-axis direction of the gas generator still another embodiment of the present invention, in (*b*), a cross-sectional view in the short-axis direction at the first fixing surface shown in (*a*), in (*c*), a cross-sectional view in the short-axis direction at the intermediate position between those shown in (*b*) and (*c*), and, in (*d*), a cross-sectional view in the short-axis direction at the second fixing surface shown in (*a*).

FIG. 6 shows, in (*a*), a cross-sectional view in the long-axis direction of the gas generator still another embodiment of the present invention, in (*b*), a cross-sectional view in the short-axis direction at the first fixing surface shown in (*a*), in (*c*), a cross-sectional view in the short-axis direction at the intermediate position between those shown in (*b*) and (*c*), and, in (*d*), a cross-sectional view in the short-axis direction at the second fixing surface shown in (*a*).

FIG. 7 shows, in (*a*), a cross-sectional view in the long-axis direction of the gas generator still another embodiment of the present invention, in (*b*), a cross-sectional view in the short-axis direction at the first fixing surface shown in (*a*), in (*c*), a cross-sectional view in the short-axis direction at the intermediate position between those shown in (*b*) and (*c*), and, in (*d*), a cross-sectional view in the short-axis direction at the second fixing surface shown in (*a*).

DETAILED DESCRIPTION OF THE INVENTION

Figure 1:
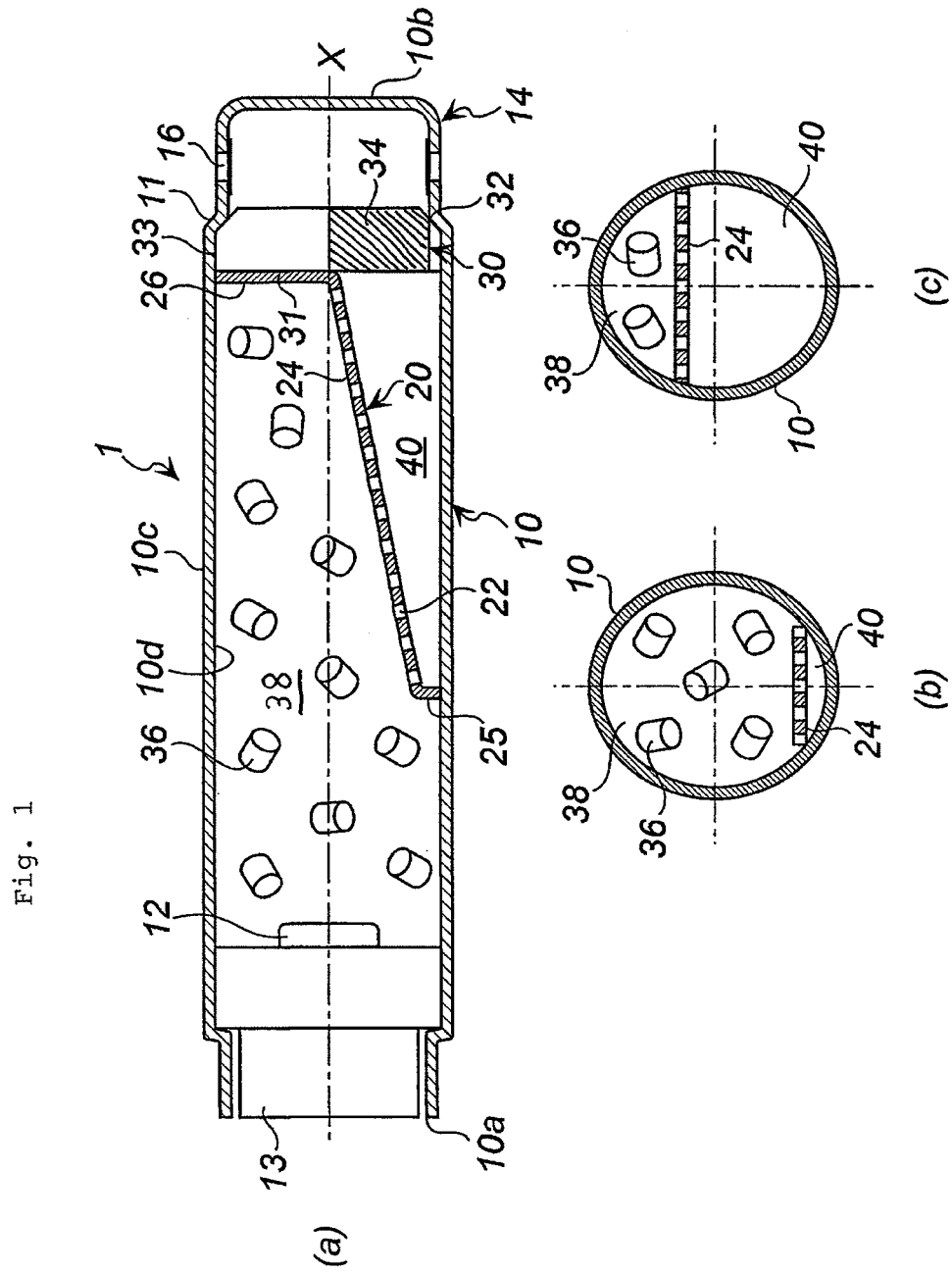
FIG. 1 shows, in (*a*), a cross-sectional view in the long-axis direction of the gas generator of the present invention in which supporting surface 31 has a through hole 34; in (*b*), a cross-sectional view in the short-axis direction at a position close to the first fixing surface shown in (*a*); and in (*c*), a cross-sectional view in the short-axis direction at a position close to the second fixing surface shown in (*a*).
Figure 1:
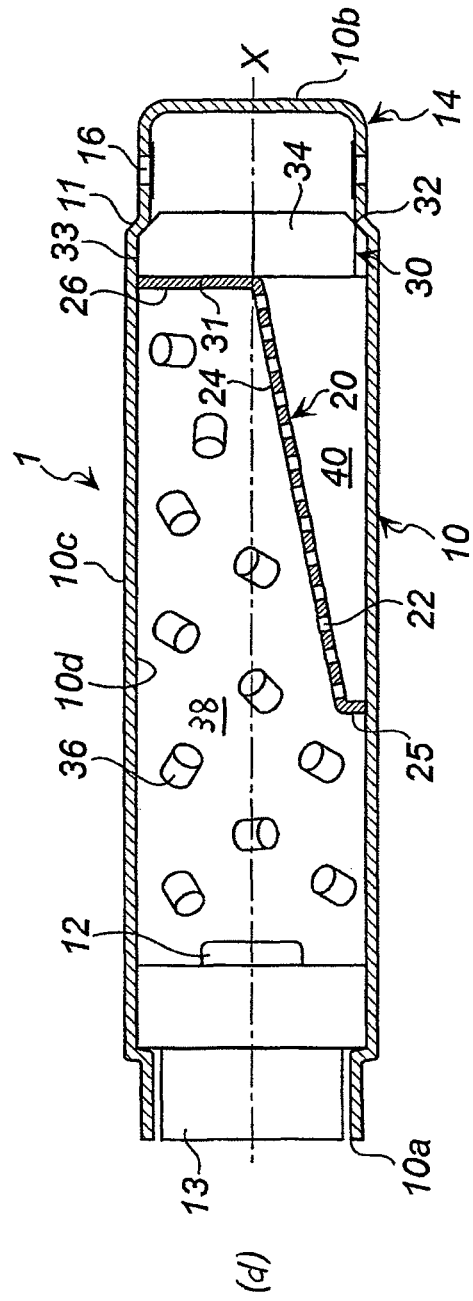

In U.S. Pat. No. 6,412,816, the outflow chamber 7 on the ignition device 2 side has a small cross-sectional area and is substantially not used as a gas passage, that is, becomes an useless space. Further, since a ratio taken by the cross-section of the filtering system 4 in the housing 1 is large, it becomes a problem in view of reducing in weight and size of the gas generator. Furthermore, the filtering system 4 is fixed by abutting only both ends thereof, and the fixing method thereof lacks stability.

The invention includes the following features. Details are below described.

The present invention provides a gas generator in which useless space inside the housing can be eliminated and the components can be tightly fixed and that can be reduced in size and weight, while maintaining smooth discharge of the generated gas.

The cylindrical housing has a uniform diameter, and one end thereof is open before the gas generator is assembled and the other end (on the diffuser portion side) has a closed end surface. The closed end surface may be also obtained by closing an opening by a separate member.

The plate-like or plate-shaped partition member is disposed so as to incline relative to the long axis X of the cylindrical housing, thereby dividing the interior thereof into the gas generating agent charging space and the gas flow channel space.

As a result, the useless space is less likely to occur than in the case in which the tubular filtering system 4 is used to divide into two spaces as in U.S. Pat. No. 6,412,816, and therefore the size can be accordingly reduced.

The plate-like or plate-shaped partition member may be a flat plate or a curved plate.

The communication hole formed in the partition member may be formed over the entire portion of the partition surface or may be concentrated on a specific portion, provided that the gas generating agent charging space and the gas flow channel space are communicated.

A size of the communication hole is such that gas passes therethrough, but the gas generating agent does not enter therein.

The partition member can be made from a perforated metal sheet, a porous screen, a wire mesh, or a combination thereof.

The communication holes may be closed with a sealing member before the gas generator is actuated.

In the gas generator in accordance with the present invention, when the partition member is disposed inside the housing, both side edges extending in the longitudinal direction thereof abut on the inner circumferential surface of the cylindrical housing. Therefore, the area in contact with the housing is large, and the partition member can be reliably fixed. Protrusions or steps that will abut against the partition member may be formed on the inner circumferential surface of the cylindrical housing.

The interior of the cylindrical housing is divided into two mutually adjacent spaces, namely, the gas generating agent charging space and the gas flow channel space.

The gas generating agent charging space and the gas flow channel space are two divided spaces that are adjacent to each other in the vertical direction, the lateral direction, or the radial direction according to the arrangement of the gas generator, and in the present invention, the gas flow channel space does not enclose the gas generating agent charging space, as in U.S. Pat. No. 6,412,816.

The partition member is not required to extend from one end to the other end of the housing. Thus, in view of eliminating the useless space from the inside of the housing, the partition member may extend from any intermediate position in the long-axis X direction to the other end, provided that the gas flow channel space communicates with the diffuser portion.

Further, since the partition member is disposed in the gas generator of the present invention, the cross-sectional area of the gas generating agent charging space (cross-sectional area in the short-axis direction perpendicular to the long axis X; same hereinbelow) decreases from the ignition device side to the diffuser portion side, and the cross-sectional area of the gas flow channel space increases from the ignition device side to the diffuser portion side.

When the gas generating agent burns, the combustion starts at the gas generating agent in the vicinity of the ignition device, and combustion gas is generated. Part of the combustion gas passes through the communication holes of the partition member and flows into the gas flow channel space (the remaining combustion gas ignites the un-burnt gas generating agent), but because, in the cylindrical housing, the gas flows from one end side to the other end side in which the gas discharge port is formed, an amount of the gas generated as the combustion advances toward the other end (that is, an amount of gas flowing into the gas flow channel space) increases.

Accordingly, since the cross-sectional area of the gas flow channel space is larger close to the gas discharge port (on the other end side), as in the present invention, the gas is smoothly discharged.

Further, in the gas generator of the present invention, when an amount of gas discharged from the housing is adjusted by the gas discharge port of the diffuser portion, the cross-sectional area of the gas flow channel space in the side of the diffuser portion is made larger than the total opening area of the gas discharge port, preferably the cross-sectional area is made larger in the gas flow channel space in the opposite side to the diffuser portion than the total opening area of the gas discharge port. Further, the total opening area of the communication holes formed in the partition surface is set to be equal to or larger than the total opening area of the gas discharge port.

A known ignition device (including an electric ignition device 12) can be used, and the ignition device may be disposed at one end of the cylindrical housing, may be arranged coaxially with the long axis of the cylindrical housing, or may be arranged obliquely or orthogonally to the long axis of the cylindrical housing. The ignition device may include an ignition device 12 alone or an ignition device 12 combined with a known transfer charge.

The diffuser portion including the gas discharge port may be formed at one end of the cylindrical housing, the gas discharge port may be formed in either or both of the circumferential surface and closed end surface of the cylindrical housing, and a cup-shaped member having a gas discharge port may be fixed to the opening of the cylindrical housing.

The first aspect of the present invention preferably may include the following first to fourth features. According to the first feature, the plate-like partition member has a plate-like partition surface, a first fixing surface obtained by bending one end of the plate-like partition surface in one direction, and a second fixing surface obtained by bending the other end of the plate-like partition surface in a direction opposite to the one direction, the first fixing surface has a first circular-arc circumferential edge that abuts against the inner circumferential surface of the cylindrical housing, the second fixing surface has a second circular-arc circumferential edge that abuts against the inner circumferential surface of the cylindrical housing, a width of the plate-like partition surface changes continuously from a width (w1) at one end that is in contact with the first fixing surface to a width (w2) at the other end that is in contact with the second fixing surface, the first circular-arc circumferential edge is abutted against the inner circumferential surface of the cylindrical housing, and the second circular-arc circumferential edge is abutted against the inner circumferential surface of the cylindrical housing in a side opposite to that of an abutment surface of the first circular-arc circumferential edge.

Where the partition member of the specific shape described in the first feature is used, the interior of the cylindrical housing can be divided into two spaces, namely, the gas generating agent charging space and the gas flow channel space, so as to obtain a predetermined variation in cross-sectional area, by fitting the partition member into the cylindrical housing.

Further, when the partition member of the above-described specific shape is used, since the contact surfaces of the partition member and the cylindrical housing is large, the partition member is tightly fixed, and slip thereof and noise caused thereby are inhibited.

The term "continuously", as used herein, refers to variations such that the width of the partition surface increases gradually from w1 to w2 or such that the width becomes equal to or greater than w1 or w2 in any portion between the first fixing surface and the second fixing surface. Those variations are determined by a position at which the ends of the partition member are disposed inside the housing.

According to the second feature, the plate-like partition member has a plate-like partition surface curved in a radial direction of the housing, a first fixing surface obtained by bending one end of the partition surface in one direction, and a second fixing surface obtained by bending the other end of the plate-like partition surface in the same direction as the first fixing surface, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing, in the plate-like partition surface that is curved in the radial direction of the housing, a width changes continuously from a width (w1) at one end that is in contact with the first fixing surface to a width (w2) at the other end that is in contact with the second fixing surface, and a maximum height (h1) of the first fixing surface from the center in the lateral direction of the plate-like partition surface to the inner circumferential surface of the housing is less than a maximum height (h2) of the second fixing surface from the center in the lateral direction of the plate-like partition surface to the inner circumferential surface of the housing, the first circular-arc circumferential edge is abutted against the inner circumferential surface of the cylindrical housing, and the second circular-arc circumferential edge is abutted against the inner circumferential surface of the housing in the same side as that of an abutment surface of the first circular-arc circumferential edge.

When the partition member of the specific shape described in according to the second feature is used, the interior of the cylindrical housing can be divided into two spaces, namely, the gas generating agent charging space and the gas flow channel space, so as to obtain a predetermined variation in cross-sectional area, by fitting the partition member into the cylindrical housing.

Further, when the partition member of the above-described specific shape is used, since the contact surfaces of the partition member against cylindrical housing is large, the partition member is tightly fixed, and slip thereof and noise caused thereby are inhibited.

The term "continuously", as used herein, refers to variations such that the width of the partition surface changes gradually in one-way from w1 to w2 or such that the width becomes equal to or greater than w1 or w2 at a portion between the first fixing surface and the second fixing surface. Those variations are determined by a position at which the partition member is disposed inside the housing.

According to the third feature, the plate-like partition member has a plate-like partition surface curved in a radial direction of the housing, a first fixing surface obtained by bending one end of the plate-like partition surface in one direction, and a second fixing surface obtained by bending the other end of the partition surface in the same direction as the first fixing surface, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing, in the plate-like partition surface that is curved in the radial direction of the housing, the width is uniform from the first fixing surface to the second fixing surface, a degree of curving changes continuously from a maximum degree of curving at one end that is in contact with the first fixing surface to a minimum degree of curving at the other end that is in contact with the second fixing surface, a maximum height (h1) of the first fixing surface from the center in the lateral direction of the plate-like partition surface to the inner circumferential surface of the housing is less than a maximum height (h2) of the second fixing surface from the center in the lateral direction of the plate-like partition surface to the inner circumferential surface of the housing, the first circular-arc circumferential edge is abutted against the inner circumferential surface of the cylindrical housing, and the second circular-arc circumferential edge abuts against the inner circumferential surface of the housing in the same side as that of an abutment surface of the first circular-arc circumferential edge.

When the partition member of the specific shape described in the third feature is used, the interior of the cylindrical housing can be divided into two spaces, namely, the gas generating agent charging space and the gas flow channel space, so as to obtain a predetermined variation in cross-sectional area, by fitting the partition member into the cylindrical housing.

Further, when the partition member of the above-described specific shape is used, since the contact surfaces of the partition member against the cylindrical housing is large, the partition member is tightly fixed, and slip thereof and noise caused thereby are inhibited.

According to the fourth feature, the plate-like partition member has, a plate-like curved bottom surface curved in a radial direction of the housing;

a first curved side surface and a second curved side surface extending from respective side edges of the curved bottom surface, a first fixing surface obtained by bending one end of the plate-like curved bottom surface in one direction, a second fixing surface obtained by bending the other end of the plate-like curved bottom surface in the same direction as the first fixing surface, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing;

in the plate-like curved bottom surface, a width changes continuously from a width at one end that is in contact with the first fixing surface to a width at the other end that is in contact with the second fixing surface, and a maximum height (h1) of the first fixing surface from the center in the lateral direction of the plate-like curved bottom surface to the inner circumferential surface of the housing is less than a maximum height (h2) of the second fixing surface from the center in the lateral direction of the plate-like curved bottom surface to the inner circumferential surface of the housing, the first circular-arc circumferential edge is abutted against the inner circumferential surface of the cylindrical housing, and the second circular-arc circumferential edge abuts against the inner circumferential surface of the housing in the same side as that of an abutment surface of the first circular-arc circumferential edge.

In the plate-like curved bottom surface of the fourth feature, it is preferable that a width changes continuously from the minimum width at one end that is in contact with the first fixing surface to the maximum width at the other end that is in contact with the second fixing surface.

When the partition member of the specific shape described in the fourth feature is used, the interior of the cylindrical housing can be divided into two spaces, namely, the gas generating agent charging space and the gas flow channel space, so as to obtain a predetermined variation in cross-sectional area, by fitting the partition member into the cylindrical housing.

Further, when the partition member of the above-described specific shape is used, since the contact surfaces of the partition member against the cylindrical housing is large, the partition member is tightly fixed, and slip thereof and noise caused thereby are inhibited.

In particular, the partition member of the specific shape described in the fourth feature has the first curved side surface and the second curved side surface. As a result, the surface area of contact with the inner circumferential surface of the cylindrical housing is larger and therefore the fixing strength is increased over that in each of the above-described inventions.

The term "continuously", as used herein, refers to variations such that the width of the curved bottom surface changes gradually in one-way from w1 to w2 or such that the width becomes equal to or greater than w1 or w2 at a portion between the first fixing surface and the second fixing surface. Those variations are determined by a position at which the partition member is disposed inside the housing.

In this gas generator, in contrast with the gas generators of the above-described inventions, the inner and outer diameters of the cylindrical housing increase continuously from the ignition device side toward the diffuser portion side, instead of being uniform.

For this reason, in contrast with the gas generators of the above-described inventions, the plate-like partition member is disposed parallel to the long axis of the cylindrical housing.

In this gas generator, the cross-sectional area of the gas generating agent charging space may increase from the ignition device side to the diffuser portion side, provided that the cross-sectional area of the gas flow channel space increases from the ignition device side to the diffuser portion side. Other features can be those of the configuration described in the first aspect of the invention.

The second aspect of the present invention may preferably include the following fifth features.

According to the fifth feature, the plate-like partition member has the plate-like partition surface, a first fixing surface obtained by bending one end of the plate-like partition surface in one direction, and a second fixing surface obtained by bending the other end of the plate-like partition surface in the same direction as the one direction, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing, in the plate-like partition surface, a width changes continuously from a width (w1) at one end that is in contact with the first fixing surface to a width (w2) at the other end that is in contact with the second fixing surface, a maximum height (h1) of the first fixing surface from the plate-like partition surface to the inner circumferential surface of the housing is less than a maximum height (h2) of the second fixing surface from the plate-like partition surface to the inner circumferential surface of the cylindrical housing, the first circular-arc circumferential edge is abutted against the inner circumferential surface of the cylindrical housing, and the second circular-arc circumferential edge abuts against the inner circumferential surface of the cylindrical housing in the same side as that of an abutment surface of the first circular-arc circumferential edge.

In the plate-like partition surface of the fifth feature, it is preferable that a width changes continuously from the minimum width (w1) at one end that is in contact with the first fixing surface to the maximum width (w2) at the other end that is in contact with the second fixing surface.

When the partition member of the specific shape described in the fifth feature is used, the interior of the cylindrical housing can be divided into two spaces, namely, the gas generating agent charging space and the gas flow channel space, so as to obtain a predetermined variation in cross-sectional area, by fitting the partition member into the cylindrical housing of the second aspect of the invention.

Further, when the partition member of the above-described specific shape is used, since the contact surfaces of the partition member against cylindrical housing is large, the partition member is tightly fixed, and slip thereof and noise caused thereby are inhibited.

The term "continuously", as used herein, refers to variations such that the width of the partition surface changes gradually in one-way from W1 to W2 or such that the width becomes equal to or greater than w1 or w2 at one portion between the first fixing surface and the second fixing surface. Those variations are determined by a position at which the partition member is disposed inside the housing.

In each of the above-described features, communication holes can be also formed in the first fixing surface of the partition member so that gas passes therethrough.

Further, in each of the above-described features, a filter that cools or purifies combustion gas can be disposed along the arrangement direction of the partition member in the gas flow channel space. The function of a filter can be also imparted to the partition member itself, thereby making it unnecessary to dispose a separate filter.

Known filters and coolants (for example, described in JP-A Nos. 10-119705 and 11-348712) can be used. The filter and coolant are not particularly limited, provided that the combustion gas and combustion residue can be cooled and filtered. For example, iron balls such as described in JP-A No. 2009-001221 can be used.

In the gas generator of the present invention, the filter is disposed so as to extend in the long-axis X direction. Therefore, a large inflow surface area is obtained when the combustion of the gas generating agent advances to the diffuser portion side and the combustion gas flows into the filter. As a result, a dispersed flow of the combustion gas is obtained inside the filter, thermal load on the filter is reduced and cooling effect is increased.

In the gas generator in accordance with the present invention, a plate-like partition member is used and the contact area with the housing is increased. As a result, the interior of the cylindrical housing is divided into two spaces, namely, the gas generating agent charging space and the gas flow channel space by the partition member that is sufficiently fixed to the inner circumferential surface of the cylindrical housing. As a result, in contrast with the invention described in U.S. Pat. No. 6,412,816, no useless space is formed, and the gas generator can be reduced in weight and size.

Further, the gas generated by the combustion of the gas generating agent is rapidly discharged to the outside through the gas generating agent charging space and the gas flow channel space.

EMBODIMENTS OF THE INVENTION (1) Gas Generator Shown in FIGS. 1 and 2

An embodiment of the gas generator 1 in accordance with the present invention will be explained below with reference to FIGS. 1 and 2. A longitudinal direction through the center X of a cylindrical housing 10 will be referred to hereinbelow as a long-axis direction, and the direction (radial direction) perpendicular to the long axis will be referred to as a short-axis direction.

The cylindrical housing 10 has a shape that is longer in the long-axis X direction than in the short-axis direction.

An end 10a at one end of the cylindrical housing 10 is open prior to assembling. A known ignition device 12 fixed to a collar 13 is attached and the end 10a is closed after the assembling.

The other end in the opposite side of the end 10a has a closed end surface 10b integrated with a circumferential wall 10c.

A step 11 is formed in the circumferential wall 10c close to the closed end surface 10b of the cylindrical housing 10, and a diffuser portion 14 with an outer diameter and an inner diameter less than those of the circumferential wall 10c is formed between the step 11 and the closed end surface 10b.

A plurality of gas discharge ports 16 is equidistantly formed in the circumferential wall of the diffuser portion 14. The gas discharge ports 16 are sealed from inside with a sealing member such as a seal tape prior to actuation.

A partition wall 30 is disposed inside the cylindrical housing 10, in contact with the diffuser portion 14.

The partition wall 30 has a through-hole 34 formed at a position offset from the center thereof and also has an annular tilted portion 32 and a support surface 31 facing a plate-like partition member 20. Because of the presence of the through-hole 34, the support surface 31 is at a position offset from the center (long axis X) of the disk-shaped partition wall 30.

In the partition wall 30, a circumferential surface 33 is abutted against an inner circumferential surface 10d of a cylindrical housing, and the annular tilted portion 32 is abutted against the step 11. The support surface 31 is positioned facing inside of the cylindrical housing 10.

The plate-like partition member 20 is disposed inside the cylindrical housing 10 and divides the cylindrical housing into two chambers, namely, a gas generating agent charging space 38 and a gas flow channel space 40.

A gas generating agent 36 charged into the gas generating agent charging space 38 is a known gas generating agent used in gas generators for airbags. The gas generating agent is molded to a desired shape such as a round columnar shape or disk-like shape.

The partition member 20 is made from an elastic metal and has a partition surface 24 having therein a plurality of communication holes 22, a first fixing surface 25 at one end, and a second fixing surface 26 at the other end.

The partition member 20 can be manufactured by bending and cutting a sheet material.

In the partition surface 24, the width (w1) at the portion that is in contact with the first fixing surface 25 is the smallest, and the width (w2) at the portion that is in contact with the second fixing surface 26 is the largest. The width changes continuously from the smallest portion to the largest portion.

The communication holes 22 are formed over the entire surface of the partition surface 24 (in the drawings, some of the communication holes are omitted). The diameter of the communication holes 22 is adjusted such that gas generated by combustion of the gas generating agent 36 can pass through the communication holes, whereas the gas generating agent 36 cannot penetrate therein.

The first fixing surface 25 is formed, being bent downward (downward in (a) in FIG. 1) from the partition surface 24, as shown in (a) in FIG. 1. The angle between the partition surface 24 and the first fixing surface 25 is not particularly limited and can be within a range of 90° to 150°.

The first fixing surface 25 has a circular-arc circumferential edge 25a (first circular-arc circumferential edge). The circular-arc circumferential edge 25a has a shape matching that of the inner circumferential surface 10d of the cylindrical housing 10. Therefore, the entire circular-arc circumferential edge 25a is abutted against the inner circumferential surface 10d of the cylindrical housing 10, without a gap therebetween.

As shown in FIG. 2, communication holes 24a are also formed in the first fixing surface 25, but no communication holes 24a may be formed in the first fixing surface 25. The diameter of the communication holes 24a is adjusted such that gas generated by combustion of the gas generating agent 36 can pass through the communication holes, whereas the gas generating agent 36 cannot penetrate therein.

The second fixing surface 26 is formed in a state of being bent upward (direction opposite that of the first fixing surface 25 in (a) in FIG. 1) from the partition surface 24, as shown in (a) in FIG. 1. The angle between the partition surface 24 and the second fixing surface 26 is preferably within a range of 90° to 150°.

The second fixing surface 26 has a circular-arc circumferential edge 26a (second circular-arc circumferential edge). The circular-arc circumferential edge 26a has a shape matching that of the inner circumferential surface 10d of the cylindrical housing 10. Therefore, the entire circular-arc circumferential edge 26a is abutted against the inner circumferential surface 10d of the cylindrical housing 10, without a gap therebetween.

As shown in FIG. 2, no communication holes are formed in the second fixing surface 26.

In the partition member 20, the entire circumferential edge 25a of the first fixing surface 25 is abutted against the inner circumferential surface 10d of the cylindrical housing 10, without a gap therebetween, the second fixing surface 26 is abutted against the support surface 31 of the partition wall 30, the circumferential edge 26a is abutted against the inner circumferential surface 10d of the cylindrical housing 10, without a gap therebetween, and both of side edges 27 abut against the inner circumferential surface 10d of the cylindrical housing 10, without a gap therebetween.

Since the second fixing surface 26 is abutted against the support surface 31, as shown in (a) in FIG. 1, the circumferential edge 25a and the circumferential edge 26a abut on the respective opposing side surfaces (upper and lower opposing sides in (a) in FIG. 1) of the inner circumferential surface 10d of the cylindrical housing.

Therefore, the partition surface 24 is disposed to be inclined relative to the long axis X.

Since the partition surface 24 is disposed so as to incline relative to the long axis X, the interior of the cylindrical housing 10 is divided into two chambers in the inclination direction, as shown in (a) in FIG. 1 (gas generating agent charging space 38 and gas flow channel space 40).

Therefore, as shown in (b) and (c) in FIG. 1, in the gas generating agent charging space 38, the volume decreases (that is, the cross-sectional area in the short-axis direction decreases) from the end 10a (on the ignition device 12 side) toward the partition wall 30 (on the diffuser portion 14 side). In the gas flow channel space 40, the volume increases in the aforementioned direction (that is, the cross-sectional area in the short-axis direction increases).

The ratio of volume (cross-sectional area) in the gas generating agent charging space 38 and gas flow channel space 40 is preferably such that the volume of the gas generating agent charging space 38 is about 50 to 95 volume %, where the total volume is taken as 100 vol %. It is even more preferred that the volume of the gas generating agent charging space 38 is about 70 to 90 volume %.

The volume may be adjusted by increasing or decreasing the length of the partition surface 24 of the partition member 20 and bringing the position of the first fixing surface 25 in (a) in FIG. 1 closer to the ignition device 12 or closer to the diffuser portion 14.

By so adjusting the volume, it is possible to adjust the cross-sectional area of the gas generating agent charging space 38 and gas flow channel space 40 in the short-axis direction.

If necessary, the gas generator 1 can include a filter or a coolant.

In the case of the gas generator shown in (a) in FIG. 1, the filter can be disposed to extend in the gas flow channel space 40. The filter may be disposed along the entire gas flow channel space 40. In this case, it is preferred that the filter has a shape matching that of the gas flow channel space 40.

A method for assembling the gas generator 1 is described below.

Prior to assembling, the end 10a of the cylindrical housing 10 is open. The partition wall 30 is inserted therethrough, and then the partition member 20 is inserted so that the second fixing surface 26 is abutted against the support surface 31 of the partition wall 30.

The predetermined amount of the gas generating agent 36 is then charged into the gas generating agent charging space 38 defined by the partition member 20. When a filter is used, the filter is inserted before inserting the partition member 20).

The ignition device 12 fixed to the collar 13 is then fitted and the collar 13 is fixed by crimping (deforming) the open portion (end 10a).

In the partition member 20, the circumferential edge 25a of the first fixing surface 25, the circumferential edge 26a of the second fixing surface 26, and the both of side edges 27 of the partition surface 24 are all abutted against the inner circumferential surface 10d of the housing 10.

The partition member 20 is pressed in the axial direction by the gas generating agent 36 and the ignition device 12 fixed to the collar 13.

Therefore, the partition member 20 is not moved inside the housing, and no noise is generated thereby.

The operation of the gas generator 1 of FIG. 1 is described below.

When the ignition device 12 is ignited by the ignition current received upon actuation, an ignition agent is burnt, combustion products (high-temperature gas, flame, and the like) are generated, and the gas generating agent 36 charged in the charging space 38 burns.

The combustion of the gas generating agent 36 is started in the vicinity of the ignition device 12, and the combustion gas generated by the combustion flows downstream (to the diffuser portion 14 side) and ignites the un-burnt gas generating agent 36 present further downstream. Part of combustion gas flows from the communication holes 22 of the partition member 20 into the gas flow channel space 40.

When the combustion thus advances in the direction of the diffuser portion 14, the amount of the generated gas gradually increases. Therefore, the amount of gas flowing into the gas flow channel space 40 also increases. Further, since the gas flow channel space 40 is disposed radially and adjacently to the gas generating agent charging space 38, the combustion gas generated on the ignition device 12 side easily flows to the diffuser portion 14, and the discharge path is prevented from being clogged even if the un-burnt gas generating agent is located inside the gas generating agent charging space.

Further, since the amount of generated gas is initially small, the cross-sectional area of the gas flow channel may be small, but the generated amount of gas increases as the combustion proceeds, and if the cross-sectional area of the gas flow channel is constant, it becomes difficult for the gas to move downstream.

However, the cross-sectional area of the gas flow channel space 40 serving as a flow channel for the combustion gas increases with being closer to the diffuser portion 14, so that a sufficient gas flow channel is ensured despite the increase in the amount of generated gas. Therefore, the gas rapidly moves downstream.

The gas that has flown into the gas flow channel space 40 passes through the through-hole 34 of the partition wall 30 and reaches the diffuser portion 14. When a predetermined pressure is reached, the sealing member closing the gas discharge port 16 is ruptured and the combustion gas is discharged to the outside of the housing 10.

When the communication holes 22 are formed over the entire portion of the partition surface 24 and a filter is disposed in the gas flow channel space 40 facing the partition surface 24, as the combustion gas, generated from the ignition device 12 side, advances to the opposite side of the housing 10 in the axial direction, the combustion gas flows from the communication holes 22 in the vicinity thereof into the gas flow channel space 40. Therefore, since the zone in the filter through which the gas passes moves together with combustion, the gas is prevented from concentrating in specific portion of the filter.

(2) Gas Generator Shown in FIGS. 3 and 4

(*a*) to (*d*) in FIG. 3 show another embodiment of a gas generator in accordance with the present invention. In the drawings, only a cylindrical housing and a partition member are shown, and a diffuser portion, a partition wall, a gas generating agent and an ignition device are omitted.

Further, in (*a*) in FIG. 3, portions corresponding to the first fixing surface 125 and the second fixing surface 126 shown in FIG. 4 are omitted.

The cylindrical housing 10 is identical to that shown in FIG. 1.

As shown in FIG. 4, a partition member 120 has a plate-like partition surface 124 curved in the radial (short-axis) direction of the housing, a first fixing surface 125 obtained by bending one end of the partition surface 124 in one direction, and a second fixing surface 126 obtained by bending the other end of the partition surface 124 in the same direction.

The first fixing surface 125 has a first circular-arc circumferential edge 125*a* that abuts against the inner circumferential surface 10*d* of the cylindrical housing.

The second fixing surface 126 has a second circular-arc circumferential edge 126*a* that has a through-hole 128 for allowing gas to pass therethrough and abuts against the inner circumferential surface 10*d* of the cylindrical housing.

The width of the plate-like partition surface 124, that is curved in the lateral direction, changes continuously from a minimum width (w1) at one end that is in contact with the first fixing surface 125 to a maximum width (w2) at the other end that is in contact with the second fixing surface 126. The curved state is the same entirely in the longitudinal direction.

A maximum height (h1) of the first fixing surface 125 from the center in the lateral direction of the partition surface 124 to the inner circumferential surface (10*d*) of the housing is less than a maximum height (h2) of the second fixing surface 126 from the center in the lateral direction of the partition surface 124 to the inner circumferential surface (10*d*) of the housing.

In the partition member 120, the entire circumferential edge (first circular-arc circumferential edge) 125*a* of the first fixing surface 125 is abutted against the inner circumferential surface 10*d* of the cylindrical housing 10, without a gap therebetween, and the second fixing surface 126 is abutted against the partition wall 30 so that the center of the through-hole 128 coincides with the center of the through-hole 34 (see FIG. 1) of the partition wall 30, the circumferential edge (second circular-arc circumferential edge) 126*a* is abutted against the inner circumferential surface 10*d* of the cylindrical housing 10, without a gap therebetween. And further, both of the side edges 127 are abutted against the inner circumferential surface 10*d* of the cylindrical housing 10, without a gap therebetween.

Therefore, when the partition member 120 is disposed inside the cylindrical housing 10, the partition surface 124 of the partition member 120 is disposed so as to incline relative to the long axis X. In this case, the curved surface (convex surface) is disposed to be on the flow channel space 140 side.

The space above the partition member 120 is the charging space 138 into which the gas generating agent 36 is charged, and the space below the partition member 120 becomes the gas flow channel space 140. The cross-sectional area of the gas flow channel space 140 is larger at the second fixing surface 126 side than at the first fixing surface 125 side.

(3) Gas Generator Shown in FIG. 5

(*a*) to (*d*) in FIG. 5 show another embodiment of a gas generator in accordance with the present invention. In the drawings, only a cylindrical housing and a partition member are shown, and a diffuser portion, a partition wall, a gas generating agent, and an ignition device are omitted.

Further, in (*a*) in FIG. 5, portions corresponding to the first fixing surface 125 and the second fixing surface 126 of the partition member 120 shown in FIG. 4 are omitted.

The cylindrical housing 10 is the same as shown in FIG. 1.

A partition member 220 is the same as the partition member 120 shown in FIG. 4, except that the width of the partition surface 224 is uniform and the degree of curving is different at both ends.

In the partition member 220, a degree of curving at a first fixing surface 225 side is different from that at a second fixing surface 226 side, and the degree of curving in a first fixing surface 225 is larger than that in a second fixing surface 226.

A maximum height (h1) of the first fixing surface 225 from the center in the lateral direction of the partition surface 224 to the inner circumferential surface (10*d*) of the housing is less than a maximum height (h2) of the second fixing surface 226 from the center in the lateral direction of the partition surface 224 to the inner circumferential surface (10*d*) of the housing.

In the partition member 220, an entire circumferential edge (first circular-arc circumferential edge) 225*a* of the first fixing surface 225 is abutted against the inner circumferential surface 10*d* of the cylindrical housing 10, without a gap therebetween, and the second fixing surface 226 is abutted against the partition wall 30 so that the center of a through-hole 228 coincides with the center of the through-hole 34 (see FIG. 1) of the partition wall 30, a circumferential edge (second circular-arc circumferential edge) 226*a* is abutted against the inner circumferential surface 10*d* of the cylindrical housing 10, without a gap therebetween. And further, both of the side edges 227 are abutted against the inner circumferential surface 10d of the cylindrical housing 10, without a gap therebetween.

Therefore, when the partition member 220 is disposed inside the cylindrical housing 10, the partition surface 224 of the partition member 220 is disposed so as to incline relative to the long axis X. In this case, the curved surface (convex surface) is disposed on the flow channel space 240 side.

The space above of the partition member 220 is a gas generating agent charging space 238 into which the gas generating agent 36 is charged, and the space below the partition member is the gas flow channel space 240. The cross-sectional area of the gas flow channel space 240 is larger at the second fixing surface 226 side than at the first fixing surface 225 side.

(4) Gas Generator Shown in FIG. 6

(a) to (d) in FIG. 6 show another embodiment of the gas generator in accordance with the present invention. In the drawings, only a cylindrical housing and a partition member are shown, and a diffuser portion, a partition wall, a gas generating agent and an ignition device are omitted.

The cylindrical housing 10 is the same as shown in FIG. 1.

A partition member 320 has a curved bottom surface 330 curved in the radial direction (short axis) of the housing and a first curved side surface 331 and a second curved side surface 332 extending from respective edges of the curved bottom surface 330. The first curved side surface 331 and the second curved side surface 332 extend in the convex surface side of the curved bottom surface 330.

A first boundary section 335 is present between the curved bottom surface 330 and the first curved side surface 331, and a second boundary section 336 is present between the curved bottom surface 330 and the second curved side surface 332.

Similarly to the partition member 120 shown in FIG. 4, the partition member 320 shown in FIG. 6 has a first fixing surface 325 and a second fixing surface 326.

The length of the curved surface forming the curved bottom surface 330 (radii r1, r2, r3 of the circles including the circular arcs shown in (b) to (d) in FIG. 6) is such that the length (r1) at the first fixing surface 325 is the smallest, the length (r3) at the second fixing surface 326 is the largest, and the length of the circular arc between the smallest portion and the largest portion changes continuously.

In this case, r1, r2, r3 are the radii of imaginary contacting circles including the respective circular-arc portions of the curved bottom surface 330, as shown in (b) to (d) in FIG. 6.

Further, as shown in (b) to (d) in FIG. 6, the maximum height (h1 in (b) in FIG. 6) of the first fixing surface 325 from the center in the lateral direction of the curved bottom surface 330 to the inner circumferential surface (10d) of the housing is less than the maximum height (h2 in (d) in FIG. 6) of the second fixing surface 326 from the center in the lateral direction of the curved bottom surface 330 to the inner circumferential surface (10d) of the housing.

In the partition member 320, the entire circumferential edge (first circular-arc circumferential edge) 325a of the first fixing surface 325 is abutted against the inner circumferential surface 10d of the cylindrical housing 10, without a gap therebetween, the second fixing surface 326 is abutted against the partition wall 30 so that the center of the through-hole 328 coincides with the center of the through-hole 34 (see FIG. 1) of the partition wall 30, and the circumferential edge (second circular-arc circumferential edge) 326a is abutted against the inner circumferential surface 10d of the cylindrical housing 10, without a gap therebetween.

In the partition member 320, the first boundary section 335, the second boundary section 336, and both side edges, equivalent to 27 of FIG. 2, are abutted against the inner circumferential surface 10d of the cylindrical housing 10, without a gap therebetween. Further, in the partition member 320, the first curved side surface 331 and the second curved side surface 332 are abutted against the inner circumferential surface 10d of the cylindrical housing 10, without a gap therebetween.

Therefore, when the partition member 320 is disposed inside the cylindrical housing 10, the partition surface of the partition member 320 is disposed so as to incline relative to the long axis X. In this case, the curved surface (convex surface) is disposed to be on a as generating agent charging space 338 side.

The space above the partition member 320 is the charging space 338 into which the gas generating agent 36 is charged, and the space below the partition member is a gas flow channel space 340. The cross-sectional area of the gas flow channel space 340 is larger on the second fixing surface 326 side than on the first fixing surface 325 side.

(5) Gas Generator Shown in FIG. 7

(a) to (d) in FIG. 7 show another embodiment of the gas generator in accordance with the present invention. In the drawings, only a cylindrical housing and a partition member are shown, and a diffuser portion, a partition wall, a gas generating agent and an ignition device are omitted.

A cylindrical housing 410 has a truncated conical shape with a diameter increasing from an end 410a to a closed end 410b.

A partition member 420 shown in FIG. 7 is the same as the partition member 120 shown in FIG. 4, except that the partition surface 124 of the partition member, shown in FIG. 4, changes to a flat shape.

In the partition member 420, a first fixing surface 425 and a second fixing surface 426 are formed to have the same orientation with respect to the partition surface 424.

The height (height based on the partition surface 424 and corresponding to h2 in (d) in FIG. 3) of the second fixing surface 426 is larger than the height (height based on the partition surface 424 and corresponding to h1 in (b) in FIG. 3) of the first fixing surface 425.

A through hole 428 for communication with the diffuser portion 14 via the hole 34 (see FIG. 1) in the partition wall 30 is formed in the second fixing surface 426.

In the partition surface 424, the width of the portion that is in contact with the first fixing surface 425 is the smallest, the width of the portion that is in contact with the second fixing surface 426 is the largest, and the width changes continuously between the smallest portion and the largest portion.

Communication holes 422 are formed over the entire surface of the partition surface 424. The diameter of the communication holes 422 is adjusted such that gas generated by combustion of the gas generating agent can pass through the communication holes, but the gas generating agent cannot penetrate therein.

In the partition member 420, the entire circumferential edge (first circular-arc circumferential edge) 425a of the first fixing surface 425 is abutted against an inner circumferential surface 410d of a cylindrical housing 410, without a gap therebetween, the second fixing surface 426 is abutted against the support surface 31 (see FIG. 1) of the partition wall 30, the circumferential edge (second circular-arc circumferential edge) 426a is abutted against the inner circumferential surface 410d of the cylindrical housing 410, without a gap therebetween, and both of the side edges 427 are abutted against the inner circumferential surface 410d of the cylindrical housing 10, without a gap therebetween.

In this case, the first fixing surface 425 and the second fixing surface 426 have the same orientation and the height thereof is adjusted to the shape of the cylindrical housing 10. Therefore, the partition surface 424 is parallel to the long axis X.

As shown in FIG. 7, the interior of the cylindrical housing 410 in the form of a truncated cone is divided into two chambers (two chambers of a gas generating agent charging space 438 and a gas flow channel space 440).

Therefore, as shown in (b) to (d) in FIG. 7, the volume (cross-sectional area) of the gas generating agent charging space 438 increases from the first fixing surface 425 toward the second fixing surface 426, and the volume (cross-sectional area) of the gas flow channel space 440 also increases in the same direction.

When the gas generator shown in FIG. 7 is actuated and the combustion advances from the gas generating agent located in the vicinity of the ignition device 12, the amount of the generated gas gradually increases, but the cross-sectional area of the gas flow channel (gas flow channel space 440) increases in the downstream direction (toward the diffuser portion side). As a result, even though an amount of generated gas increases, the flow channel is ensured and combustion and discharge of the gas proceed smoothly.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device comprising:
a cylindrical housing having an ignition device provided at one end in a longitudinal axis direction thereof and a diffuser portion including a gas discharge port provided at the other end thereof;
a gas generating agent charged in an inner space of the housing;
a plate-like partition member, having a communication hole, disposed, in an inner space of the cylindrical housing, so as to incline relative to the longitudinal axis (X) of the cylindrical housing, thereby dividing the inner space into two mutually adjacent spaces, that is, a gas generating agent charging space and a gas flow channel space, the gas flow channel space communicating with the diffuser portion,
both of side edges of the plate-like partition member being abutted against an inner circumferential surface of the cylindrical housing,
a cross-sectional area of the gas generating agent charging space in a short-axis direction perpendicular to the longitudinal axis (X) decreasing from a side of the ignition device toward a side of the diffuser portion,
a cross-sectional area of the gas flow channel space in the short-axis direction increasing from a side of the ignition device toward a side of the diffuser portion,
wherein the plate-like partition member has a partition surface, a first fixing surface at one end of the plate-like partition member, and a second fixing surface at an opposite end of the plate-like partition member,
the first fixing surface and the second fixing surface abut the inner circumferential surface of the cylindrical housing, and
respective side edges of the partition surface abut the inner circumferential surface of the cylindrical housing.

2. A gas generator for a restraining device according to claim 1, wherein
plate-like partition member has a plate-like partition surface, the first fixing surface is obtained by bending one end of the plate-like partition surface in one direction, and the second fixing surface is obtained by bending the opposite end of the plate-like partition surface in a direction opposite to the one direction,
the first fixing surface has a first circular-arc circumferential edge that abuts against the inner circumferential surface of the cylindrical housing,
the second fixing surface has a second circular-arc circumferential edge that abuts against the inner circumferential surface of the cylindrical housing,
a width of the plate-like partition surface changes continuously from a width (w1) at one end that is in contact with the first fixing surface to a width (w2) at the other end that is in contact with the second fixing surface,
the first circular-arc circumferential edge is abutted against the inner circumferential surface of the cylindrical housing, and
the second circular-arc circumferential edge is abutted against the inner circumferential surface of the cylindrical housing in a side opposite to that of an abutment surface of the first circular-arc circumferential edge.

3. A gas generator for a restraining device according to claim 1, wherein
the plate-like partition member has a plate-like partition surface curved in a radial direction of the housing, the first fixing surface is obtained by bending one end of the plate-like partition surface in one direction, and the second fixing surface is obtained by bending the opposite end of the plate-like partition surface in the same direction as the first fixing surface,
the first fixing surface has a first circular-arc circumferential edge that abuts against the inner circumferential surface of the cylindrical housing,
the second fixing surface has a second circular-arc circumferential edge that has a through-hole for allowing gas to pass therethrough and abuts against the inner circumferential surface of the cylindrical housing,
in the plate-like partition surface that is curved in the radial direction of the housing,
a width changes continuously from a width (w1) at one end that is in contact with the first fixing surface to a width (w2) at the other end that is in contact with the second fixing surface, and
a maximum height (h1) of the first fixing surface from the center in the lateral direction of the plate-like partition surface to the inner circumferential surface of the housing is less than a maximum height (h2) of the second fixing surface from the center in the lateral direction of the plate-like partition surface to the inner circumferential surface of the housing,
the first circular-arc circumferential edge is abutted against the inner circumferential surface of the cylindrical housing, and
the second circular-arc circumferential edge is abutted against the inner circumferential surface of the housing in the same side as that of an abutment surface of the first circular-arc circumferential edge.

4. A gas generator for a restraining device according to claim 1, wherein
the plate-like partition member has a plate-like partition surface curved in a radial direction of the housing, the first fixing surface is obtained by bending one end of the plate-like partition surface in one direction, and the second fixing surface is obtained by bending the opposite end of the partition surface in the same direction as the first fixing surface, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing, in the plate-like partition surface that is curved in the radial direction of the housing, the width is uniform from the first fixing surface to the second fixing surface, a degree of curving changes continuously from a maximum degree of curving at one end that is in contact with the first fixing surface to a minimum degree of curving at the other end that is in contact with the second fixing surface, a maximum height ($h_1$) of the first fixing surface from the center in the lateral direction of the plate-like partition surface to the inner circumferential surface of the housing is less than a maximum height ($h_2$) of the second fixing surface from the center in the lateral direction of the plate-like partition surface to the inner circumferential surface of the housing, the first circular-arc circumferential edge is abutted against the inner circumferential surface of the cylindrical housing, and the second circular-arc circumferential edge abuts against the inner circumferential surface of the housing in the same side as that of an abutment surface of the first circular-arc circumferential edge.

5. A gas generator for a restraining device according to claim 1, wherein the plate-like partition member has,
    a plate-like curved bottom surface curved in a radial direction of the housing; and
    a first curved side surface and a second curved side surface extending from the respective side edges of the curved bottom surface, the first fixing surface is obtained by bending one end of the plate-like curved bottom surface in one direction, the second fixing surface is obtained by bending the opposite end of the plate-like curved bottom surface in the same direction as the first fixing surface, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing;

in the plate-like curved bottom surface, a width changes continuously from a minimum width at one end that is in contact with the first fixing surface to a maximum width at the other end that is in contact with the second fixing surface, and a maximum height ($h_1$) of the first fixing surface from the center in the lateral direction of the plate-like curved bottom surface to the inner circumferential surface of the housing is less than a maximum height ($h_2$) of the second fixing surface from the center in the lateral direction of the plate-like curved bottom surface to the inner circumferential surface of the housing, the first circular-arc circumferential edge is abutted against the inner circumferential surface of the cylindrical housing, and the second circular-arc circumferential edge abuts against the inner circumferential surface of the housing in the same side as that of an abutment surface of the first circular-arc circumferential edge.

6. A gas generator for a restraining device comprising:

a cylindrical housing having an ignition device provided at one end in a longitudinal axis direction thereof and a diffuser portion including a gas discharge port provided at the other end thereof, and a gas generating agent charged in an inner space of the housing, an inner diameter and an outer diameter of the cylindrical housing increasing continuously from a side of the ignition device toward a side of the diffuser portion;

a plate-like partition member, having a communication hole, disposed, in an inner space of the cylindrical housing, so as to be parallel to the longitudinal axis (X) of the cylindrical housing, thereby dividing the inner space into two mutually adjacent spaces, that is, a gas generating agent charging space and a gas flow channel space, the gas flow channel space communicating with the diffuser portion, both of side edges of the plate-like partition surface being abutted against an inner circumferential surface of the cylindrical housing, at least a cross-sectional area of the gas flow channel space in a short-axis direction perpendicular to the longitudinal axis increasing from a side of the ignition device toward a side of the diffuser portion, wherein the plate-like partition member has a partition surface, a first fixing surface at one end of the plate-like partition member, and a second fixing surface at an opposite end of the plate-like partition member, the first fixing surface and the second fixing surface abut the inner circumferential surface of the cylindrical housing, and respective side edges of the partition surface abut the inner circumferential surface of the cylindrical housing.

7. A gas generator for a restraining device according to claim 6, wherein the partition surface of the plate-like partition member is a plate-like partition surface, the first fixing surface is obtained by bending one end of the plate-like partition surface in one direction, and the second fixing surface is obtained by bending the opposite end of the plate-like partition surface in the same direction as the one direction, the first fixing surface has a first circular-arc circumferential edge that abuts against the inner circumferential surface of the cylindrical housing, the second fixing surface has a second circular-arc circumferential edge that has a through-hole for allowing gas to pass therethrough and abuts against the inner circumferential surface of the cylindrical housing, in the plate-like partition surface, a width changes continuously from a minimum width ($w_1$) at one end that is in contact with the first fixing surface to a maximum width ($w_2$) at the other end that is in contact with the second fixing surface, a maximum height ($h_1$) of the first fixing surface from the plate-like partition surface to the inner circumferential surface of the housing is less than a maximum height ($h_2$) of the second fixing surface from the plate-like partition surface to the inner circumferential surface of the cylindrical housing, the first circular-arc circumferential edge is abutted against the inner circumferential surface of the cylindrical housing, and the second circular-arc circumferential edge abuts against the inner circumferential surface of the cylindrical housing in the same side as that of an abutment surface of the first circular-arc circumferential edge.

8. A gas generator for a restraining device according to claim 1, wherein the first fixing surface has a communication hole.

9. A gas generator for a restraining device according to claim 1, wherein a filter that cools or purifies combustion gas is disposed, in the gas flow channel space, along an arrangement direction of the partition member.

* * * * *